W. G. STOUT.
POULTRY HOUSE.
APPLICATION FILED APR. 7, 1909.
975,733.
Patented Nov. 15, 1910.
5 SHEETS—SHEET 5.
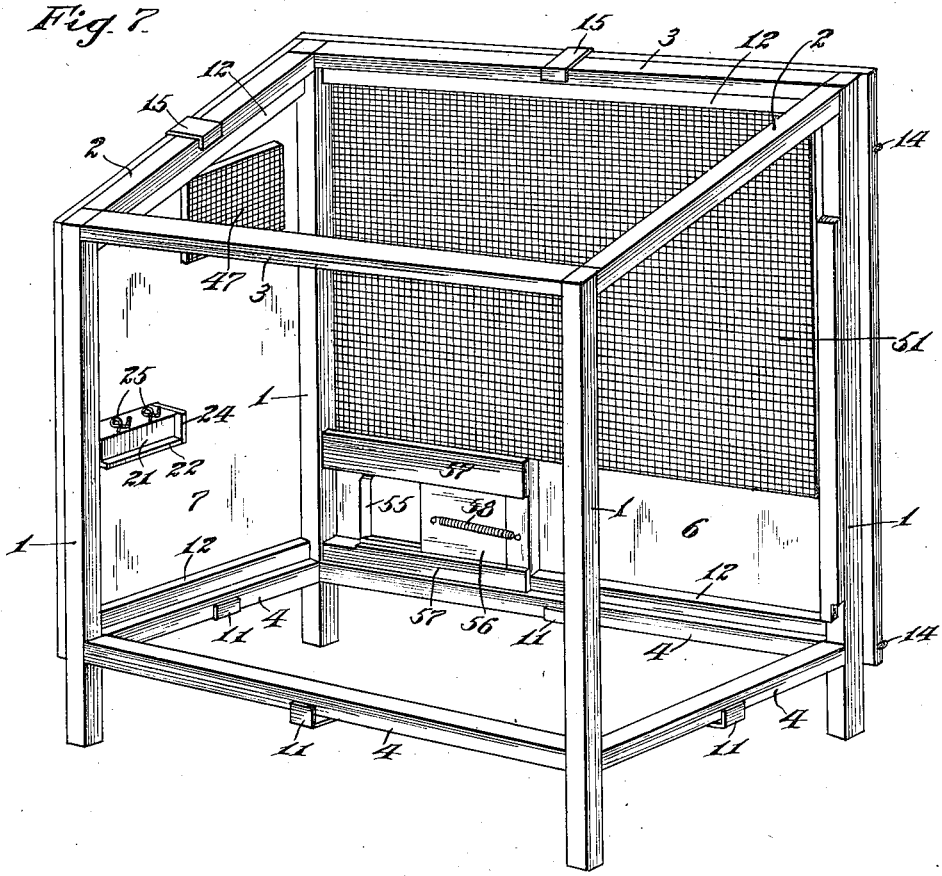
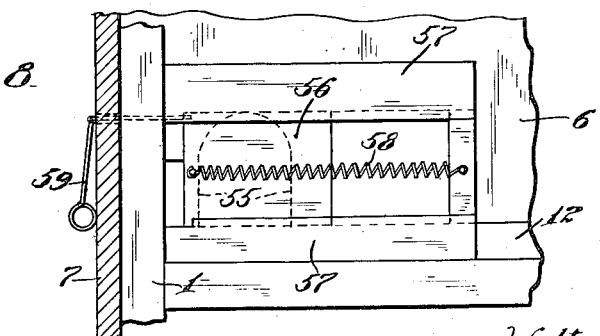
Witnesses
Theo. Rosemund.
J. T. L. Mulhall.
Inventor
Walter G. Stout,
By Joshua R. H. Potts,
Attorney

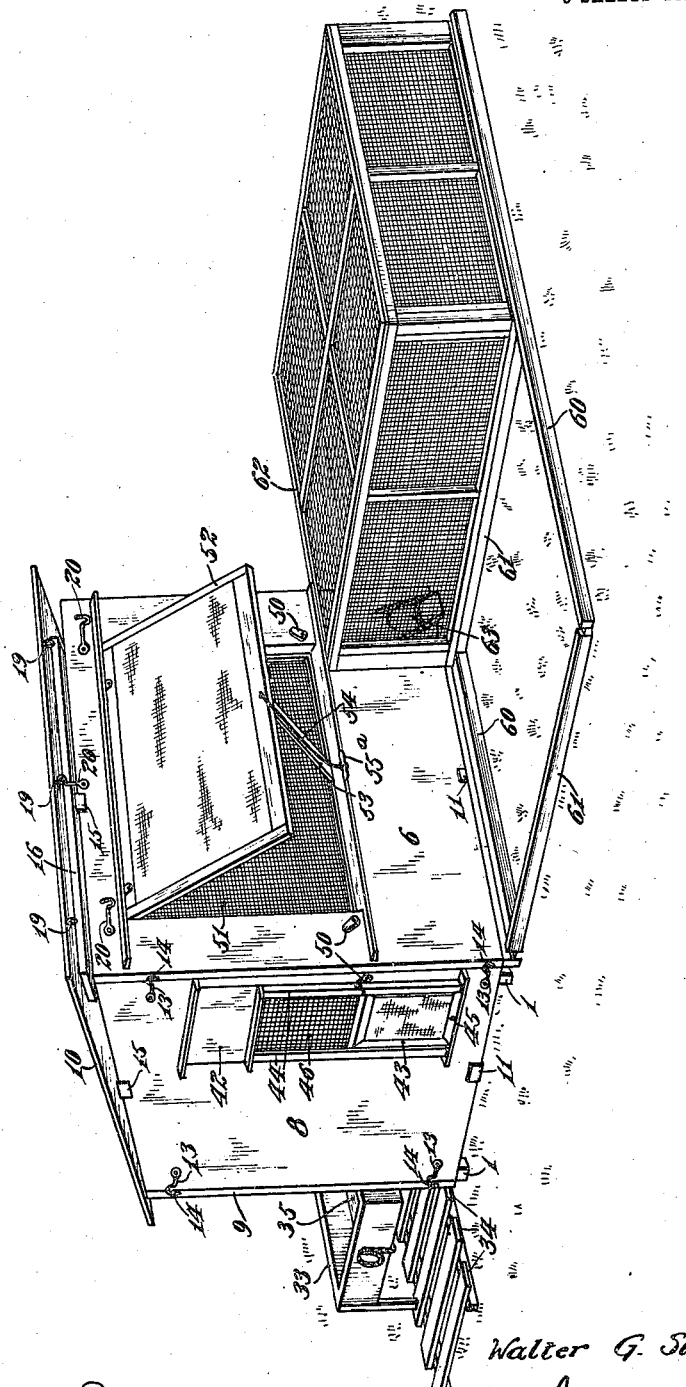

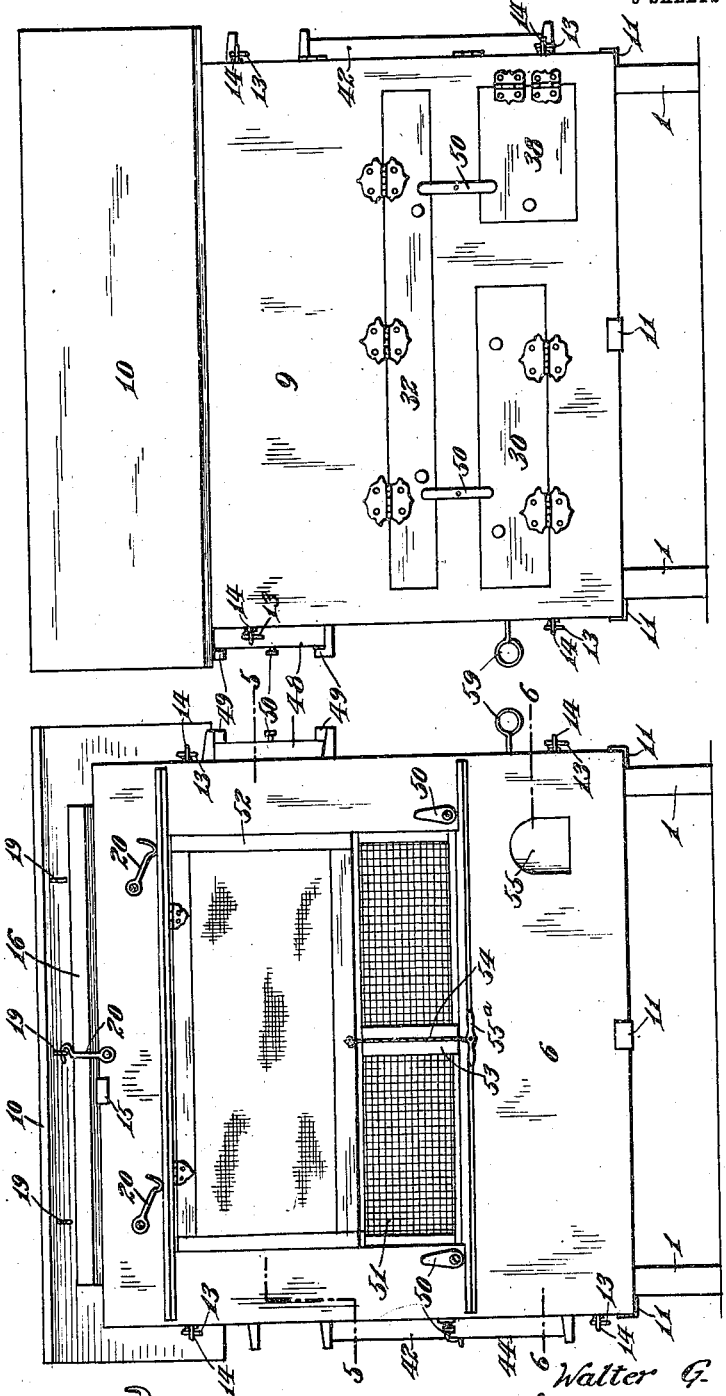

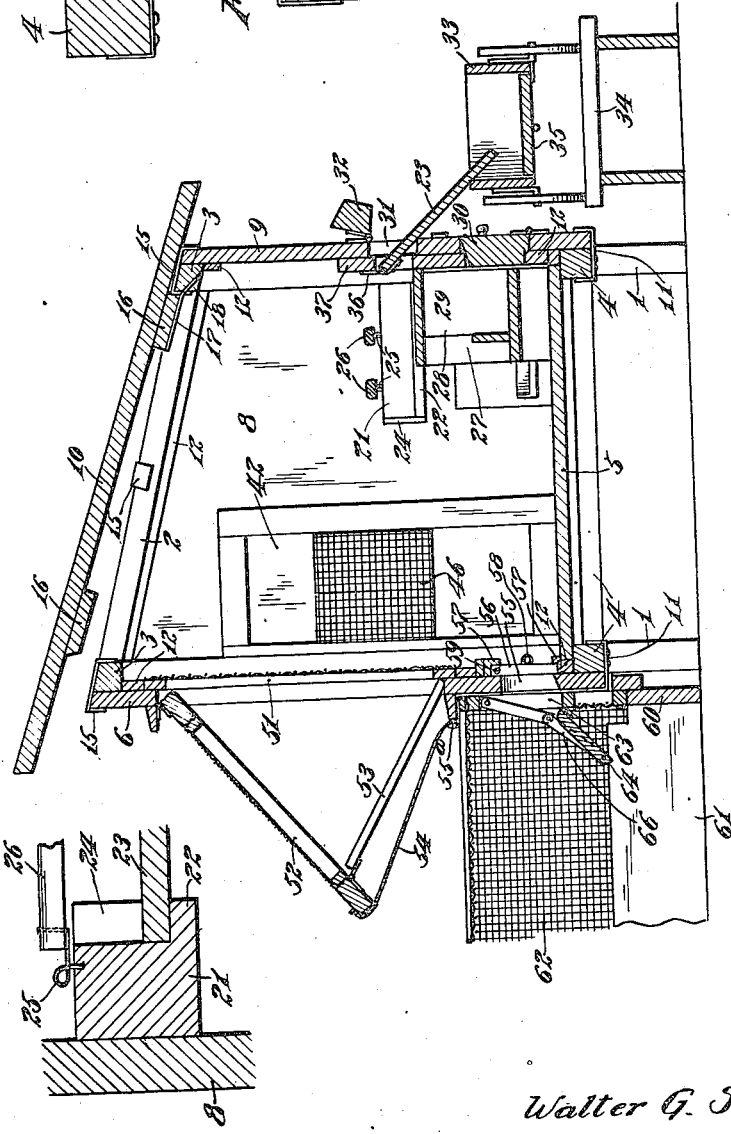

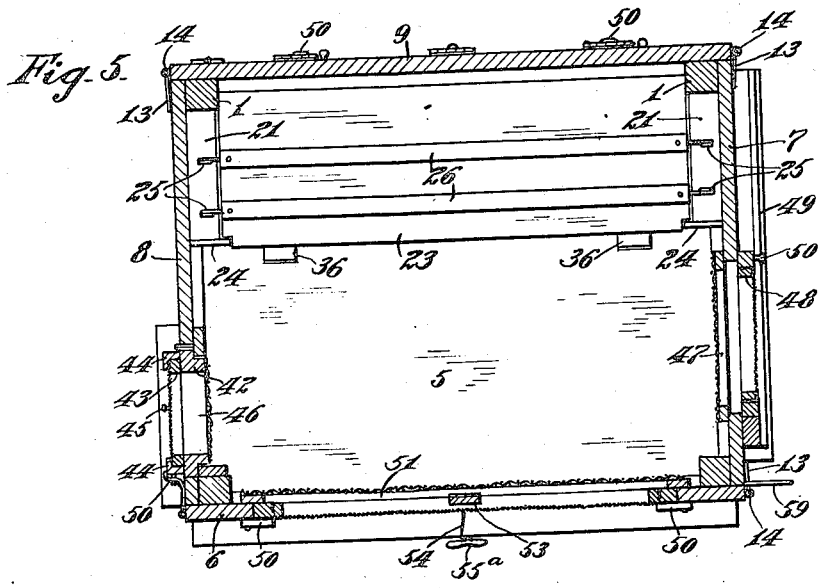
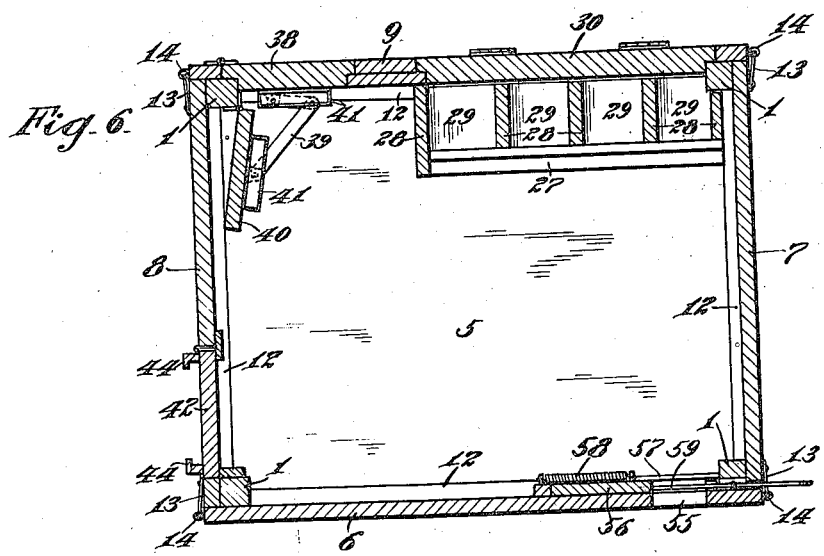

UNITED STATES PATENT OFFICE.

WALTER G. STOUT, OF PHILADELPHIA, PENNSYLVANIA.

POULTRY-HOUSE.

975,733.

Specification of Letters Patent.   Patented Nov. 15, 1910.

Application filed April 7, 1909.   Serial No. 488,498.

*To all whom it may concern:*

Be it known that I, WALTER G. STOUT, a citizen of the United States, residing at Philadelphia, in the county of Philadelphia and State of Pennsylvania, have invented certain new and useful Improvements in Poultry-Houses, of which the following is a specification.

My invention relates to improvements in poultry houses, the object of the invention being to provide a house, which can be kept clean with the greatest possible facility, which will have perfect ventilation, which will be warm and tight in cold weather, and which can be easily opened to admit free circulation of air therethrough.

A further object is to provide an improved arrangement of roosting rods and dropping board, which latter may be readily positioned, so as to be cleaned from the outside of the house without the necessity of entering the same.

A further object is to provide an improved arrangement of feeding doors, which can be swung to position to receive food and water from the outside of the house, and then be returned to a position to present the food and water to the poultry on the inside of the house.

A further object is to provide an improved construction and arrangement of nests within the house, to which access may be had from the outside of the house to remove the eggs without entering the house.

A further object is to provide an improved construction of house, which can be readily knocked down, or in other words, parts can be readily separated from each other and opened up to the action of sunlight to thoroughly disinfect the same.

A further object is to provide an improved construction and arrangement of doors, windows and roof, which will permit perfect ventilation, and which can be readily closed to protect the poultry from inclement weather.

A further object is to provide an improved construction of door for closing the poultry outlet from the house.
A further object is to provide an improved construction of poultry yard or runway, which latter will be shifted from place to place within certain limits, so as to allow the grass to grow on certain patches of ground, while the poultry are feeding upon other patches.

A further object is to provide an improved frame work to which the walls, bottom and roof of the house can be readily secured, or from which they may be removed as will be desired.

With these and other objects in view, the invention consists in certain novel features of construction, and combinations, and arrangements of parts as will be more fully hereinafter described and pointed out in the claims.

In the accompanying drawings, Figure 1, is a perspective view illustrating my improvements. Fig. 2, is a view in elevation of the front of the house. Fig. 3, is a view in elevation of the back of the house. Fig. 4, is a view in vertical section from front to rear of the house showing a part of the yard or run-way. Fig. 5, is a view in horizontal section on the line 5—5 of Fig. 2. Fig. 6, is a view in horizontal section on the line 6—6 of Fig. 2. Fig. 7, is a perspective view illustrating the frame work of the house with but one end, and the front secured thereto. Fig. 8, is a detail view partly in section and partly in elevation illustrating a door for closing the poultry outlet. Fig. 9, is an enlarged detail view showing the manner of supporting the roosting rods.
Figs. 10 and 11, are enlarged detail views illustrating the couplings for holding the walls to the frame.

My improved house is built up around a frame work, consisting of four vertical studs 1, the front studs being longer than the back, and connected at their upper ends by inclined bars 2, to give the necessary slope or incline of the roof, and horizontal bars 3 connect the parallel front and rear studs as shown. Horizontal bars 4 connect the four studs 1 at points removed from the lower end of the studs, so that the latter will constitute legs or columns to support the house above the ground. The floor or bottom 5 of the house is notched to accommodate the studs 1, and enable the floor to overlap the bars 4 and be supported on the latter.

6 represents the front wall of the house, 7 and 8 the ends, 9 the back, and 10 the top or roof. These walls are entirely independent of each other, and are preferably made of wood, but I am of course, not limited to any particular material used in the construction of the house.
As indicated clearly in Figs. 7 and 10, sheet metal couplings 11 are secured to the under face of bars 4, and project outwardly from the latter, and are bent upwardly as shown, to confine the lower edges of the front, sides and back, and the latter are provided with horizontal bars 12 near their upper and lower ends to engage the bars 2, 3 and 4, and form a perfect fit in the frame. These walls are connected by hooks 13 and eyes 14 as clearly shown, and couplings 15 couple the upper edges of the walls with the bars 2 and 3, and when the hooks and eyes are in engagement, an extremely strong and solid structure will result.

The top or roof 10 is provided with strengthening cross bars 16 on its under face, and to the rear cross bar 16, metal tongues 17 are secured, and are adapted to enter recesses 18 in the cross bar 3, and prevent upper movement of the rear end of the roof, but permit the front end of the roof to be raised or lowered, and the roof to be drawn off the house as may be desired, and which will be readily understood by reference to Fig. 4. The roof 10 projects over the walls at all four sides of the house and the forwardly projecting portion of the roof is provided with eyes 19, and the front of the house is provided with hooks 20. The center hook 20 is in a higher plane than the side hooks 20, and is adapted to enter the center eye 19 of the top, and support the roof in an elevated position as shown in Figs. 2 and 4, to allow a free circulation of air from the interior of the house, and assist in ventilating the same. The other hooks 20 are so positioned as to lock the roof tightly down upon the walls in inclement weather.

Blocks 21 are secured to the end walls 7 and 8 near their rear edges, and properly spaced from the floor, and these blocks are made with supporting flanges 22 to support and guide a sliding dropping board 23, the forward movement of the board being limited by lips 24 on the blocks 21. Hooks 25 are removably secured on the blocks 21, and are adapted to enter openings in the ends of roosting rods 26, and support the latter, but permit their ready removal when desired. Below the dropping board, a frame 27 is located, and is divided by partitions 28, into a series of nests 29, to which access may be had through an opening in the back, and normally closed by a hinged door 30, so that the eggs can be removed from the nests without the necessity of entering the house. The frame 27 is removable, and may be taken out of the house whenever desired to cleanse and disinfect the same. The back 9 of the house is provided with an elongated opening 31 in a plane in line with the dropping board 23, and this opening is normally closed by a hinged door 32, which I term the dropping door.

33 represents a wheeled cart, which is adapted to be positioned upon a run-way or walk 34 at the back of the house, and is provided preferably with a dumping bottom 35. When this cart 33 is in position at the rear of the house, the door 32 can be opened and the dropping board drawn out to an inclined position as clearly shown in Fig. 4.

The dropping board is provided with metal tongues 36, which are adapted to engage a cross bar 37 on the rear wall 9 just above the opening 31, and hold the dropping board in an inclined position, with its lower edge projecting into the cart 33. While in this position, the board can be thoroughly cleansed, the droppings falling into the cart, and the board can then be returned to its position and the cart moved away and dumped.

38 represents a feeding door, having a hinged mounting as shown, and normally closing an opening in the rear wall 9. This feeding door 38 is connected by pivoted links 39, with a second feeding door 40, the latter also hinged and adapted when door 38 is drawn open, to be moved by the pivoted links 39 to a position to close the opening in the wall 9. Watering and feeding troughs 41 are secured to the doors 38 and 40, so that when the door 38 is swung open, and the door 40 to closed position, these troughs will both be accessible from the outside, to be cleaned and filled, and when the door 38 is closed, both troughs will be accessible to the poultry within the house.

The end wall 8 is provided with a hinged door 42, which latter is made with a sliding sash 43, mounted to slide in grooved bars 44 on the door, and provided with a pin or other lock 45, adapted to hold the sash over a screen opening 46 of the door, or else be dropped to a position to expose the screen. This sash is provided with a filling of cloth, which will permit the filtered air to enter the house, but will prevent loss of heat, and will maintain the house sufficiently warm in cold weather. The other end wall 7 is provided with a screen opening 47, which may be closed by a sash 48 mounted to slide in horizontal guides 49 on the wall. The sash is also filled with cloth, and its function is the same as the other sash 43 above described.

Suitable catches or locks 50 may be provided to lock the several doors, but of course, I do not limit myself to any particular form of lock.

The front wall 6 is made with a large screened opening 51, and a sash 52 having a filling of canvas is hinged at its upper end as shown, and adapted to close the screened opening in cold weather. This sash 52 is provided with a hinged prop 53, adapted to hold the sash in an inclined position as shown in the drawings, so that the sash will constitute an awning, and while allowing free circulation of air, will protect the poultry from the direct rays of the sun, and will keep the house cool. This sash may be secured in an open position by means of a cord 54, secured around a holding device 55ª on the front 6, and will prevent the sash from being blown upward to release the prop.

55 represents the poultry outlet, which is preferably located near one corner and in the front as shown, and this outlet is adapted to be closed by a door 56, the latter mounted to slide in guides 57 on the inner face of the front. This door is normally held in open position by a coiled spring 58, and is drawn to closed position by means of a hinged rod 59, the latter adapted when drawn outward to close the door, to be swung downwardly on its hinge and lock the door in closed position as clearly shown in Fig. 8.

In front of the front wall 6, and embedded in the ground, sufficiently deep to prevent the poultry digging under the same, I provide longitudinal and cross bars 60 and 61 respectively, the former serving as rails of a track on which my improved cage 62 is mounted to slide. This cage may be made in various ways, but is preferably of rectangular form, and composed in large part of wire screen, so as to allow free circulation of air, and free entrance of the rays of the sun to the poultry confined thereby. The intermediate cross bars 61 project higher than the other bars, and serve to limit sliding movement of the cage, effectually guiding the poultry entrances 63 into register with the poultry outlet 55 in the front of the house. The purpose of this yard or run-way, is to confine the poultry to a certain area, where they may feed upon the growing grass and plants, while another portion of the ground is bringing forth a new crop, and by this means, the yard or cage may be shifted from one section of the ground to another, so as to prevent the poultry devastating any particular spot.

While I have shown but two adjustments of the yard, it is manifest that a number of such adjustments may be made with but slight alterations in the structure, and various other changes might be resorted to without departing from my invention, and hence I do not restrict myself to the precise details set forth, but consider myself at liberty to make such changes and alterations as fairly fall within the spirit and scope of the claims.

Having thus described my invention, what I claim as new and desire to secure by Letters Patent is:

1. In combination with a four walled structure, a top or roof, tongues on said top or roof, and the rear wall of said structure having recesses to receive said tongues, eyes on the forward lower face of said top or roof, hooks on the front wall of the structure, adapted to engage said eyes and lock the roof in closed position, and a hook on said front adapted to engage one of said eyes, and hold the roof in an elevated or partly open position.

2. In a device of the class described, a frame comprising a plurality of vertical members, horizontal members connecting the same adjacent the lower ends thereof and substantially horizontal members connecting the upper ends of said vertical members forming a substantially rectangular open structure, panels for closing the spaces between said vertical and horizontal members, transverse members secured to the inner faces of said panels and adapted to fit snugly between the respective frame members, a hook shaped bracket secured to each of the lower horizontal members of the frame and adapted to extend upwardly on the outer face of the respective panels, a detachable metal clip securing the upper horizontal frame members and the upper ends of the panels together, and hook and eye connections between the edges of adjacent panels, substantially as described.

In testimony whereof I have signed my name to this specification in the presence of two subscribing witnesses.

WALTER G. STOUT.

Witnesses:
R. H. KRENKEL,
J. A. L. MULHALL.